United States Patent [19]
Alessio

[11] 4,059,930
[45] Nov. 29, 1977

[54] REMOVABLE GUARD ARRANGEMENT FOR A POWER TOOL HAVING A ROTATING HEAD FOR PERFORMING WORK ON A WORKPIECE

[75] Inventor: Lorenzo Ercole Alessio, Lecco, Italy

[73] Assignee: The Black and Decker Manufacturing Company, Towson, Md.

[21] Appl. No.: 692,217

[22] Filed: June 2, 1976

[30] Foreign Application Priority Data

July 30, 1975 Italy .................................. 25929/75

[51] Int. Cl.$^2$ ............................................. B24B 55/04
[52] U.S. Cl. .................................... 51/268; 51/170 T
[58] Field of Search ............... 51/170 T, 268, 170 R, 51/177, 377, 170 PT

[56] References Cited

U.S. PATENT DOCUMENTS

| 2,246,683 | 6/1941 | Holt | 51/177 |
|---|---|---|---|
| 2,316,886 | 4/1943 | Pascucci | 51/177 |
| 3,428,984 | 2/1969 | Collier | 51/177 |

FOREIGN PATENT DOCUMENTS

| 2,500,216 | 9/1975 | Germany | 408/204 |
|---|---|---|---|
| 1,907,371 | 9/1970 | Germany | 51/170 T |
| 2,426,772 | 1/1975 | Germany | 51/177 |

Primary Examiner—Donald G. Kelly
Assistant Examiner—Roscoe V. Parker
Attorney, Agent, or Firm—Walter Ottesen; Edward D. Murphy; Leonard Bloom

[57] ABSTRACT

The invention is directed to a removable guard arrangement for a power tool having a rotating head for performing work on a workpiece and includes a guard member and a mounting member which is fixedly attached to the tool for accommodating the guard member thereon. The guard member and the mounting member are configured so as to facilitate the removable bayonet engagement of the members. A locking device is provided for locking the guard member in place on the mounting member.

14 Claims, 9 Drawing Figures

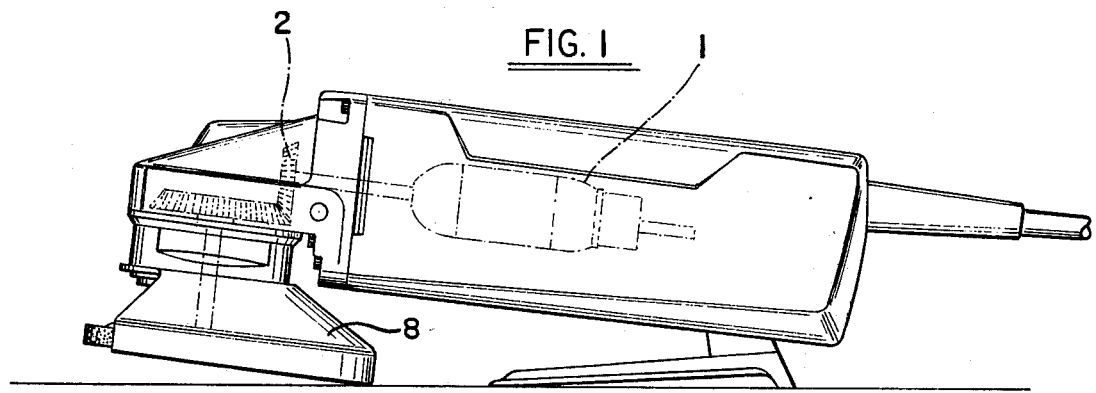
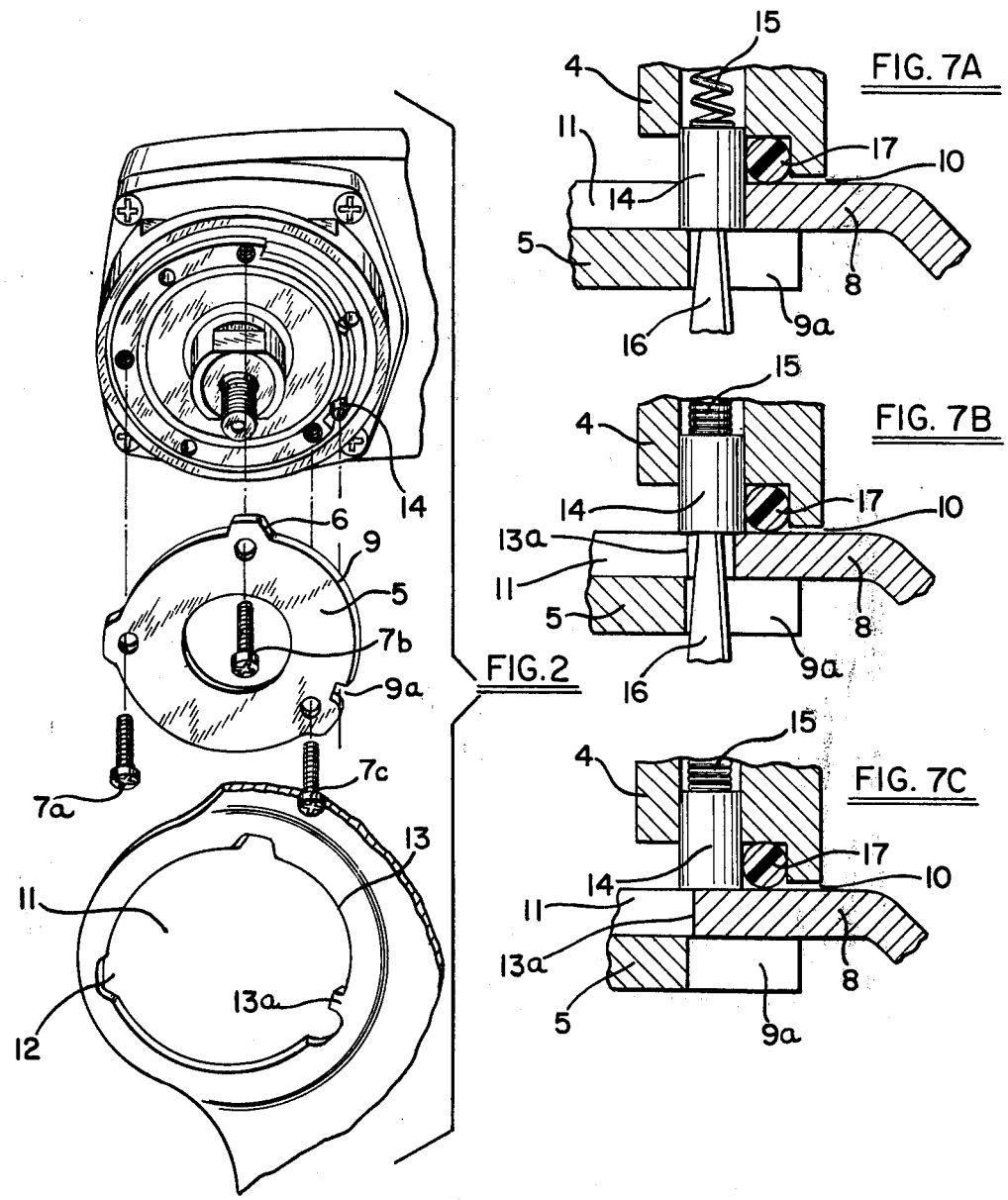

REMOVABLE GUARD ARRANGEMENT FOR A POWER TOOL HAVING A ROTATING HEAD FOR PERFORMING WORK ON A WORKPIECE

BACKGROUND OF THE INVENTION

It is known to equip both stationary and portable power tools having a rotating head with a guard for protecting the user of the tool against injury should the work wheel or drill driven by rotating head break during use of the tool. Such guards are especially useful in portable power angle tools having drive shaft for driving an interchangeable work wheel such as a grinding wheel, sanding wheel, abrasion wheel or the like.

However, it is desirable from time-to-time to perform maintenance work on the tool such as cleaning the gear head and for this purpose it is necessary to remove the guard.

It is known to secure such a guard by means of bolts between the flange on the guard and the mating flange on the operating head of the power tool. In other conventional tools, a resilient split ring can be provided which surrounds the operating head of the power tool and is secured by means of a screw clamp at the front end of the ring. However, in each of the above instances, considerable time and effort is required to remove the guard from the operating head of the tool.

SUMMARY OF THE INVENTION

Accordingly, it is an object of my invention to provide a guard arrangement for power tools wherein the guard can be removed simply and quickly. It is another object of my invention to provide such an arrangement wherein the guard can be removed easily with the aid of a convenient tool such as a small screwdriver or the like.

Although my invention has general application to both stationary and portable electric power tools, it is especially applicable to power angle grinders which require that the guard be disposed in spaced surrounding relation to the work wheel.

The removable guard arrangement according to my invention is suited to power tools having an operating head for rotatably driving a tool for working a workpiece. The removable guard arrangement of the invention includes a guard member; a mounting member fixedly attached to the tool for accommodating the guard member thereon; means formed on the guard member and the mounting member for facilitating the removable bayonet engagement of the members; and locking means for locking the guard member in place on the mounting member.

According to a preferred embodiment of my invention, the guard member has an opening formed therein and, at the edge defining this opening, there is provided a plurality of recesses and projections. A mounting plate member is also provided for accommodating the guard member on the tool. The mounting plate member is arranged transverse to the axis of the drive shaft and is fixedly attached to the operating head to conjointly define therewith a space. The mounting plate member has an outer periphery which likewise defines a plurality of recesses and projections. The plurality of recesses and projections on the members are interdigitable with each other so that the guard can be passed over the member plate into the above-mentioned space wherein the guard member can be rotated to cause the mounting plate member to overlap the guard member. In addition, a locking mechanism locks the guard in position and includes a locking piece and a resilient means in the form of a spring for holding the locking piece in a first position against the mounting plate to restrict the movement of the guard member in the above-mentioned space to maintain the overlap. The locking piece is so mounted that it is movable against the force of the spring to a second position thereby permitting the guard member to be manually rotated beneath the locking piece so as to bring the recesses and projections of the guard member and mounting plate member into interdigitable alignment thereby facilitating removal of the guard member from the tool.

Thus, the removable guard of the invention provides that the operating head of the power tool and the guard member are adapted to be connected together by means of a bayonet fastening. A locking device which can be released merely by axial movement is provided between the stationary and movable members of the fastening. The mounting plate member can be a substantially circular plate secured to the operating head and spaced therefrom to provide a space. On the other hand, the guard member is provided with a corresponding opening and the plate and the edge defining the opening are provided with complementary projections and recesses. And, according to another embodiment of my invention, one of the projections coacts with the locking device.

The above objectives and advantages of my invention will become more apparent from a consideration of the detailed description to follow taken in conjunction with the drawing annexed hereto.

BRIEF DESCRIPTION OF THE DRAWING

FIG. 1 is a perspective view of the overall tool showing the motor and bevel gear assembly in phantom outline.

FIG. 2 is an exploded perspective view of the removable guard arrangement according to the invention.

FIGS. 7A-7C illustrate the sequence of steps required to remove the guard from the power tool with the aid of a simple elongated tool

DESCRIPTION OF THE PREFERRED EMBODIMENTS OF THE INVENTION

Figure 3:
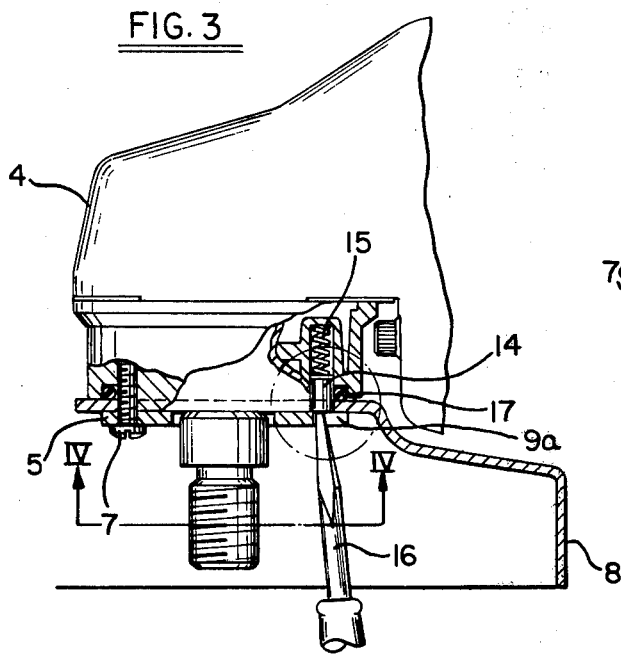
FIG. 3 is an elevation view, partially in section, showing the guard arrangement according to the invention fitted to the operating head of the portable angle tool of FIG. 1.

Referring now more specifically to the drawing, an electric power angle grinder is shown in FIG. 1 and incorpotes the removable guard arrangement according to the invention.

The angle grinder includes a motor 1 shown in phantom outline as well as a bevel gear assembly 2 likewise shown in phantom outline. The portable grinder shown in FIG. 1 is equipped with a paddle switch mechanism 3. Detail with regard to the portable power angle tool and switch mechanism 3 may be obtained from the copending application entitled: "Portable Power Angle Tool and Switch Mechanism" of Nelson Sherwood Chester and William Frank Sindelar filed on Apr. 8, 1976.

FIG. 2 shows the removable guard arrangement according to the invention in an exploded view and shows how the parts making up the arrangement are assembled.

Referring now to FIG. 3, the operating head 4, a part of which is shown schematically is equipped with a circular mounting plate member 5 having three radial projectins 6 (FIG. 4) spaced equally around its periphery. Between each two mutually adjacent projections 6 there is a recess 9. The plate 5 is fixedly mounted to the head 4 by three bolts 7a, 7b, and 7c arranged on bolt circle 7d. Reference numeral 8 designates the guard member. A notch 9a is provided at one of the recesses 9 adjacent one of the projections 6.

Figure 5:
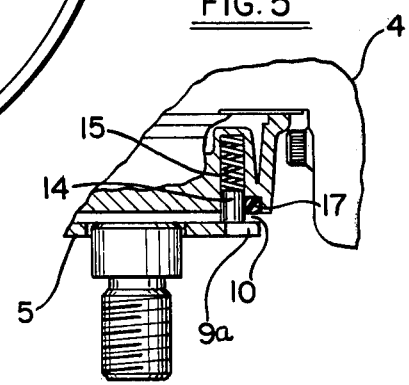
FIG. 5 is a view, partially in section, of a portion of the operating head without the guard member mounted thereon taken along line V—V of FIG. 4.

Plate 5 is spaced from head 4 in order to conjointly define therewith a space 10 as shown in FIG. 5 which illustrates the operating head 4 and removable guard arrangement without the guard member. The purpose of space 10 will become clear below.

Figure 6:
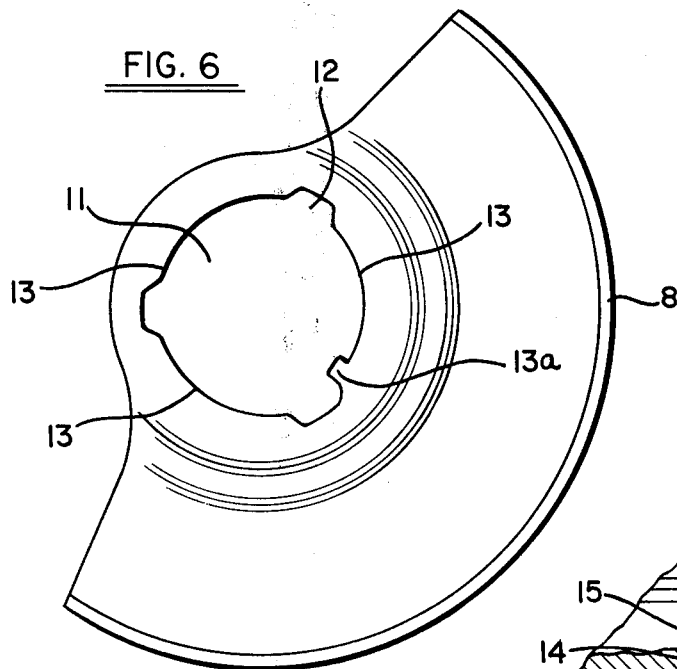
FIG. 6 is a plan view of the guard member.

FIG. 6 shows the guard 8 which is generally semicircular in shape and has a central circular opening 11, the diameter of which is substantially equal to that of plate 5. The edge of the guard 8 defining opening 11 also has three recesses 12 formed therein and, between each two mutually adjacent recesses 12, there are provided projections 13. One of the projections 13 is provided with a tooth 13a. The recesses 12 and projections 13 correspond, in configuration and arrangement, to projections 6 and recesses 9 of plate 5. The projections and recesses on the guard 8 and plate 5 conjointly constitute means for facilitatiing the removable bayonet engagement of the guard 8 and plate 5.

The operating head 4 is also provided with locking means including a locking piece in the form of a stop or locking pin 14 which is maintained in the extended position, shown in FIG. 3 by resilient means constituted by a spring 15 and thus bears against the inside surface of plate 5 in alignment with the notch 9a. The pin 14 has a somewhat larger diameter than the width of the notch 9a and therefore does not pass through the plate 5.

The guard 8 is fitted to the operating head 4 in the following manner.

Opening 11 in guard 8 is slipped axially onto plate 5 and into space 10 in a manner such that recesses 12 are aligned with projections 6 and projections 13 are aligned with recesses 9. The application of slight pressure to the guard 8 will cause tooth 13a of projection 13 to depress locking pin 20. If guard 8 is then rotated in space 10 through a certain angle, the plate 5 will overlap the guard 8. Specifically, projections 6 of plate 5 will overlap and engage the marginal edge defined by projections 13 of guard 8. In addition, the plate 5 will also overlap the tooth 13a of the guard 8. This produces a bayonet fastening engagement in which plate 5 is the stationary part and the guard 8 is the moving part. Pin 20, as soon as it is released from the action of tooth 13a will again be extended by spring 15 to its first position shown in FIG. 3, thereby preventing tooth 13a from getting into alignment with notch 9a of recess 9 and allowing the casing to become separated from operating head 4.

Whenever it is required to remove the guard 8 from head 4, all that is necessary is to depress pin 20 by means of any pointed or elongated element such as a small screw driver 16 and then to rotate the guard 8 in order to bring projections 13 and recesses 12 into alignment with recesses 9 and projections 6 respectively. A simple axial pull will now suffice to remove the guard 8 from the head 4. This will now be shown with greater specificity in the sequence of views provided by FIGS. 7A to 7C which are exploded views of the region enclosed by the broken-line circle shown in FIG. 3.

FIG. 7A is an exploded view, partially in section, showing details of the locking device. Shown in FIG. 7A is the locking pin 14 held in a first position against the mounting plate 5 by means of the spring 15. Shown in outline behind the pin is the tooth-like projection 13 of the guard 8. The pin 14 serves to prevent rotation of the guard 8 past the location of the pin 14 and so restricts the movement of the guard 8 in space 10 to maintain plate 5 overlapping guard 8 thereby securely holding the guard 8 on the operating head 4.

Bolts 7a–7c are arranged on a bolt circle 7d which passes through pin 14 so that one of these bolts 7b also contributes to restricting the movement of guard 8 in the space 10 by coacting with pin 14 to establish a sector beyond which the tooth 13a and hence the guard 8 cannot be rotated.

The locking pin 14 presses against plate 5 at notch 9a thereof thereby leaving the pin 14 accessible from the underside of the plate 5. With the aid of a simple tool such as the screw driver 16, the pin 14 can be lifted.

In FIG. 7B, the pin 14 has been moved to its second position by compressing spring 15. Now the guard 8 can be rotated in space 10 toward the pin location whereat the projections and recesses of the guard 8 will be in interdigitable alignment with the complementary recesses and projections in the mounting plate 5. The pin 14 is now held in its second position by the tooth 13a of guard 8.

FIG. 7C shows the guard 8 in position ready for withdrawal from the operating head 4 of the power tool. As the guard 8 is withdrawn from the head 4 in a direction along the axis of the shaft, spring 15 will move the pin 14 back to its first position.

The O-ring 17 acts as a seal for bearings located in the operating head 4 of the angle grinder while at the same time affording a friction fit for the guard 8 within the space 10 so that guard 8 sits tight on the tool.

Figure 4:
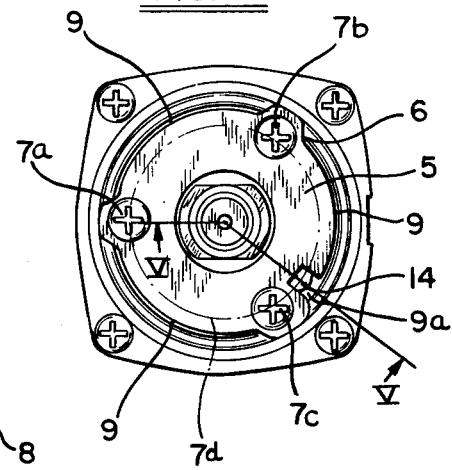
FIG. 4 is a plan view taken along line IV—IV of FIG. 3

As shown in FIGS. 4 and 6, a recess on one of the members and a complementary projection on the other one of the members can be configured so as to key the guard member with respect to the mounting plate member.

By the foregoing, I have disclosed a removable guard arrangement for a power tool and while a preferred embodiment has been illustrated and described herein, various additions, substitutions, modifications and omissions may be made thereto without departing from the spirit of the invention.

I claim:

1. A removable guard arrangement for a power tool having a rotating head for rotatably driving a tool for working a workpiece comprising:
   a guard member;
   a mounting member fixedly attached to the tool for accommodating said guard member thereon;
   means formed on said guard member and said mounting member for removably bayonet-engaging said members; and
   a locking mechanism including: a locking piece, resilient means for holding said locking piece in a first position against said mounting member to restrict the movement of said guard member while mounted on said mounting member, and engaging means formed on said guard member for engaging said locking piece when said locking piece is in said first position, said locking piece and said engaging means defining respective engaging surfaces extending in direction parallel to each other thereby ensuring that said guard member is held firmly on said mounting member, said locking piece being mounted so as to be movable against the force of said resilient means to a second position thereby permitting said guard member to be rotated past said locking piece so as to facilitate the bayonet removal of said guard member from the tool.

2. A removable guard arrangement for a portable power angle tool having a drive shaft for driving a rotating work wheel such as a grinding wheel, sanding wheel, abrasion wheel or the like comprising:
a guard member;
a mounting plate for accommodating said guard member, said mounting plate being fixedly attached to the tool so as to be transverse to the axis of the drive shaft;
means formed on said guard member and said mounting member for removably bayonet-engaging said members; and,
a locking mechanism including: a locking piece, resilient means for holding said piece in a first position against said mounting member to restrict the movement of said guard member while mounted on said mounting member, and engaging means formed on said guard member for engaging said locking piece when said locking piece is in said first position, said locking piece and said engaging means defining respective engaging surfaces extending in direction parallel to each other thereby ensuring that said guard member is held firmly on said mounting member, said locking piece being mounted so as to be movable against the force of said resilient means to a second position thereby permitting said guard member to be rotated past said locking piece so as to facilitate the bayonet removal of said guard member from the tool.

3. In a portable power angle tool having an operating head and a rotatable drive shaft extending from the operating head, the shaft being adapted for accommodating an interchangeable work wheel such as a grinding wheel, sanding wheel, abrasion wheel or the like, a removable guard arrangement comprising:
a removable guard member configured for mounting on the tool in spaced relation to the work wheel, said guard member having an edge defining an opening for facilitating passing said guard member over the shaft of the tool;
a mounting plate member for accommodating said guard member on the tool, said mounting plate member being arranged transverse to the axis of the drive shaft and being fixedly attached to the operating head so as to conjointly define therewith a space, said mounting plate member having an outer periphery;
means formed on said edge of said guard member and on said outer periphery of said mounting member for removably bayonet inserting said guard member into said space; and
a locking mechanism including: a locking piece, and resilient means for holding said locking piece in a first position against said mounting plate member to restrict the movement of said guard member to maintain the same in said space, said locking piece being mounted so as to be movable against the force of said resilient means to a second position thereby permitting said guard member to be rotated beneath said piece so as to facilitate the bayonet removal of said guard member from the tool.

4. In a portable power angle tool having an operating head and a rotatable drive shaft extending from the operating head, the shaft being adapted for accommodating an interchangeable work wheel such as a grinding wheel, sanding wheel, abrasion wheel or the like, a removable guard arrangement comprising:
a removable guard member configured for mounting on the tool in spaced relation to the work wheel, said guard member having an edge defining an opening in said guard member for facilitating passing said guard member over the shaft of the tool;
a mounting plate member for accommodating said guard member on the tool, said mounting plate member being arranged transverse to the axis of the drive shaft and being fixedly attached to the operating head so as to conjointly define therewith a space, said mounting plate member having an outer periphery defining a plurality of recesses and projections;
said edge of said guard member defining a plurality of recesses and projections interdigitable with said recesses and projections of said mounting plate member for facilitating passing said guard member over said plate member into said space wherein said guard member is rotatable to cause said mounting plate member to overlap said guard member; and
a locking mechanism including: a locking piece, and resilient means for holding said locking piece in a first position against said mounting plate member to restrict the movement of said guard member in said space to maintain said overlap, said locking piece being mounted so as to be movable against the force of said resilient means to a second position thereby permitting said guard to be manually rotated beneath said locking piece so as to bring said recesses and projections of said members into interdigital alignment thereby facilitating removal of said guard member from the tool.

5. The portable power angle tool of an ancillary on one of said members and an ancillary complementary projection on the other one of said members being configured so as to key said guard member with respect to said mounting plate member.

6. In a portable power angle tool having an operating head and a rotatable drive shaft extending from the operating head, the shaft being adapted for accommodating an interchangeable work wheel such as a grinding wheel, sanding wheels, abrasion wheel or the like, a removable guard arrangement wherein the guard can be manually removed with the aid of a simple elongated tool such as a screw driver of the like.
the removable guard arrangement comprising:
a removable guard member configured for mounting on the tool in spaced relation to the work wheel, said guard member having an edge defining an opening in said guard member for facilitating passing said guard member over the shaft of the tool;
a mounting plate member for accommodating said guard member on the tool; said mounting plate member being arranged transverse to the axis of the drive shaft and being fixedly attached to the operating head so as to conjointly define therewith a space, said mounting plate member having an outer periphery defining a plurality of recesses and projections;

said edge of said guard member defining a plurality of recesses and projections interdigitable with said recesses and projections of said mounting plate member for facilitating passing said guard member over said plate member into said space wherein said guard member is rotatable to cause said mounting plate member to overlap said guard member; and, a locking mechanism including: a locking piece, and resilient means for holding said locking piece in a first position against said mounting plate member at one side of said plate member to restrict the movement of said guard member in said space to maintain said overlap, said locking piece being disposed so as to bear against said mounting plate member at one of the recesses therein thereby leaving said locking piece accessible from the other side of said plate member through said one recess, said locking piece being mounted so as to be movable against the force of said resilient means in response to pressure applied manually through said one recess with the aid of the simple elongated tool, said locking piece being movable to a second position whereat said guard member can be rotated beneath said locking piece so as to bring said recesses and projections of said members into interdigital alignment thereby facilitating removal of said guard member from the tool.

7. The portable power angle tool of claim 6, an ancillary recess on one of said members and an ancillary complementary projection on the other one of said members being configured to key said guard member with respect to said mounting plate member.

8. The portable power of angle tool of claim 6, said space having a width corresponding substantially to the thickness of said edge of said guard member.

9. In a portable power angle tool having an operating head and a rotatable drive shaft extending from the operating head, the shaft being adapted for accommodating an interchangeable work wheel such as a grinding wheel, sanding wheel, abrasion wheel or the like, a removable guard arrangement wherein the guard can be manually removed with the aid of a simple elongated tool such as a screw driver or the like.

the removable guard arrangement comprising:

a removable guard member configured for mounting on the tool in spaced relation to the work wheel, said guard having an edge defining a substantially circular opening in said guard member;

a substantially circular mounting plate member for accommodating said guard member on the tool, said mounting plate member being arranged transverse to the axis of the drive shaft and being fixedly attached to the operating head so as to conjointly define therewith with a space, said mounting plate member having an outer periphery defining a plurality of recesses and projections;

said edge of said guard member defining a plurality of recesses and projections interdigitable with said recesses and projections of said mounting plate member for facilitating passing said guard member over said plate member into said space wherein said guard member is rotatable to cause said mounting plate member to overlap said guard member respectively; and, a locking mechanism including: a locking piece, and resilient means for holding said locking piece in a first position against said mounting plate member at one side of said plate member; one of said projections of said guard member being configured to contact said locking piece in said first position thereby restricting the movement of said guard member in said space to maintain said overlap, said locking piece being disposed so as to bear against said mounting plate member at one of the recesses therein thereby leaving said locking piece accessible from the other side of said plate member through said one recess, said locking piece being mounted so as to be movable against the force of said resilient means in response to pressure applied manually through said one recess with the aid of the simple elongated tool, said locking piece being movable to a second position whereat said guard member can be rotated beneath said locking piece so as to bring said recesses and projections of said members into interdigital alignment thereby facilitating removal of said guard member from the tool.

10. The portable power angle tool of claim 9, to plurality of bolts for securing said mounting plate member to said operating head, said bolts being arranged on a bolt circle passing through the location of said one recess whereby said locking piece and one of said bolts coact to define the limits of rotational movement of said guard member with said space.

11. The portable power angle tool of claim 10, an ancillary recess on one of said members and an ancillary complementary projection on the other one of said members being configured to key said guard member with respect to said mounting plate member.

12. The portable power angle tool of claim 11, said space having a width corresponding substantially to the thickness of said edge of said guard member.

13. The portable power angle tool of claim 12 comprising: a seal mounted on the operating head and extending into said space to frictionally engage said guard member whereby said guard member is held tightly in said space.

14. In a portable power angle tool having an operating head and a rotatable drive shaft extending from the operating head, the shaft being adapted for accommodating an interchangeable work wheel such as a grinding wheel, sanding wheel, abrasion wheel or the like, a removable guard arrangement comprising:

a removable guard member configured for mounting on the tool in spaced relation to the work wheel, said guard member having an edge defining an opening for facilitating passing said guard member over the shaft of the tool;

a mounting plate member for accommodating said guard member on the tool, said mounting plate member being arranged transverse to the axis of the drive shaft and being fixedly attached to the operating head so as to conjointly define therewith a space, said mounting plate member having an outer periphery;

means formed on said edge of said guard member and on said outer periphery of said mounting member for removably bayonet-inserting said guard member into said space; and a locking mechanism including: a locking piece, resilient means for holding said locking piece in a first position against said mounting plate member to restrict the movement of said guard member to maintain the same in said space, and engaging means forced on said edge of said guard member for engaging said locking piece when said locking piece is in said first position, said locking piece and said engaging means defining respective engaging surfaces extending in directions parallel to each other thereby ensuring that said guard member is held firmly in said space against undesired rotational movement thereof, said locking piece being mounted so as to be movable against the force of said resilient means to a second position thereby permitting said guard member to be rotated beneath said piece so as to facilitate the bayonet removal of said guard member from the tool.

* * * * *